(12) United States Patent
Kato

(10) Patent No.: US 11,196,974 B2
(45) Date of Patent: Dec. 7, 2021

(54) DISPLAY CONTROL APPARATUS AND DISPLAY CONTROL METHOD

(71) Applicant: CANON KABUSHIKI KAISHA, Tokyo (JP)

(72) Inventor: Yuji Kato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 16/045,568

(22) Filed: Jul. 25, 2018

(65) Prior Publication Data
US 2019/0037199 A1    Jan. 31, 2019

(30) Foreign Application Priority Data

Jul. 28, 2017 (JP) .............................. JP2017-146339

(51) Int. Cl.
| | |
|---|---|
| *H04N 13/117* | (2018.01) |
| *H04N 13/398* | (2018.01) |
| *H04N 13/106* | (2018.01) |
| *G06F 3/0481* | (2013.01) |
| *H04N 5/247* | (2006.01) |

(52) U.S. Cl.
CPC ....... *H04N 13/117* (2018.05); *G06F 3/04815* (2013.01); *H04N 5/247* (2013.01); *H04N 13/158* (2018.05); *H04N 13/398* (2018.05)

(58) Field of Classification Search
CPC .. H04N 13/117; H04N 13/158; H04N 13/398; H04N 5/247; G06F 3/04815
USPC .......................................................... 348/39
See application file for complete search history.

(56) References Cited

U.S. PATENT DOCUMENTS

| | | | |
|---|---|---|---|
| 9,412,203 B1 * | 8/2016 | Garcia, III | ......... G06Q 30/0643 |
| 2007/0002037 A1 * | 1/2007 | Kuroki | .................. G06T 19/006 |
| | | | 345/418 |
| 2007/0238981 A1 * | 10/2007 | Zhu | ........................ A61B 90/36 |
| | | | 600/424 |
| 2011/0261076 A1 * | 10/2011 | Shinohara | ............... A63F 13/10 |
| | | | 345/650 |
| 2012/0057064 A1 * | 3/2012 | Gardiner | ............... G06F 3/0346 |
| | | | 348/333.12 |

FOREIGN PATENT DOCUMENTS

| | | | |
|---|---|---|---|
| JP | 2015187797 A | 10/2015 | |
| JP | 2017012397 A | 1/2017 | |

\* cited by examiner

*Primary Examiner* — Kathleen V Nguyen
(74) *Attorney, Agent, or Firm* — Canon U.S.A., Inc. IP Division

(57) ABSTRACT

A display control apparatus configured to control displaying of a virtual viewpoint video image generated based on a plurality of captured images acquired from a plurality of cameras configured to capture an image of an image capturing target space from a different direction includes a reception unit configured to receive a user operation relating to a position and an orientation of a virtual viewpoint, a generation unit configured to generate a virtual viewpoint video image based on the user operation received by the reception unit, and a switch unit configured to switch a mode from a first mode of displaying a virtual viewpoint video image received from a server to a second mode of displaying the virtual viewpoint video image generated by the generation unit based on the user operation, in response to detection of a predetermined user operation during the first mode.

20 Claims, 11 Drawing Sheets

DISPLAY CONTROL APPARATUS AND DISPLAY CONTROL METHOD

BACKGROUND

Field of the Disclosure

The present disclosure relates to a display control method of a virtual viewpoint video image.

Description of the Related Art

Techniques for generating virtual viewpoint video images from video images captured by a plurality of cameras having different viewpoints are known. Examples of a known method of generating a virtual viewpoint video image (rendering method) include a method in which virtual viewpoint video images are generated based on a predetermined movement path of a virtual viewpoint and a method in which virtual viewpoint video images are generated based on the position and orientation of a virtual viewpoint designated by a viewer, or the like. In the present specification, the former method will be referred to as "pre-rendering" and the latter as "real-time rendering".

The real-time rendering is characterized in that highly-interactive video images are viewable but the image quality can deteriorate. On the other hand, the pre-rendering is characterized in that high-quality video images are generated although viewers cannot operate a viewpoint because virtual viewpoint video images are generated in advance based on a preset virtual camera movement path. A method for improving interactive properties of display video images is discussed in Japanese Patent Application Laid-Open No. 2015-187797 in which video images of relevant viewpoints are received in advance in addition to video images of the viewpoint viewed by the user so that the video images of the plurality of viewpoints can be switched.

However, in the cases where video images of a plurality of viewpoints are merely switched and displayed, the viewpoints selectable by the viewer are limited, so that the viewer cannot freely select a viewpoint desired to view. Further, constant execution of real-time rendering leads to problems of image quality and processing load.

For example, in real-time rendering, virtual viewpoint video images based on the position and orientation of a virtual viewpoint need to be generated in real time based on polygon data, texture data, etc. on an object. In the cases where the virtual viewpoint video images are generated at a terminal, e.g., smartphone, of a viewer, the image quality of the video images can be low or the video images cannot be generated in time for reproduction, depending on the processing capacity of the terminal. Further, for example, in the cases where the virtual viewpoint video images are generated in real time at a server, if each of a plurality of clients designates the position and orientation of a virtual viewpoint, the processing load on the server becomes significant. As described above, the real-time rendering and the pre-rendering have both merits and demerits, and there are demands for a system capable of assimilating the merits of both the real-time rendering and the pre-rendering.

SUMMARY

According to an aspect of the present disclosure, a display control apparatus configured to control displaying of a virtual viewpoint video image generated based on a plurality of captured images acquired from a plurality of cameras configured to capture an image of an image capturing target space from a different direction includes a reception unit configured to receive a user operation relating to a position and an orientation of a virtual viewpoint, a generation unit configured to generate a virtual viewpoint video image based on the user operation received by the reception unit, and a switch unit configured to switch a mode from a first mode of displaying a virtual viewpoint video image received from a server to a second mode of displaying the virtual viewpoint video image generated by the generation unit based on the user operation, in response to detection of a predetermined user operation during the first mode.

Further features of the present disclosure will become apparent from the following description of exemplary embodiments with reference to the attached drawings.

DESCRIPTION OF THE EMBODIMENTS

Figure 1:
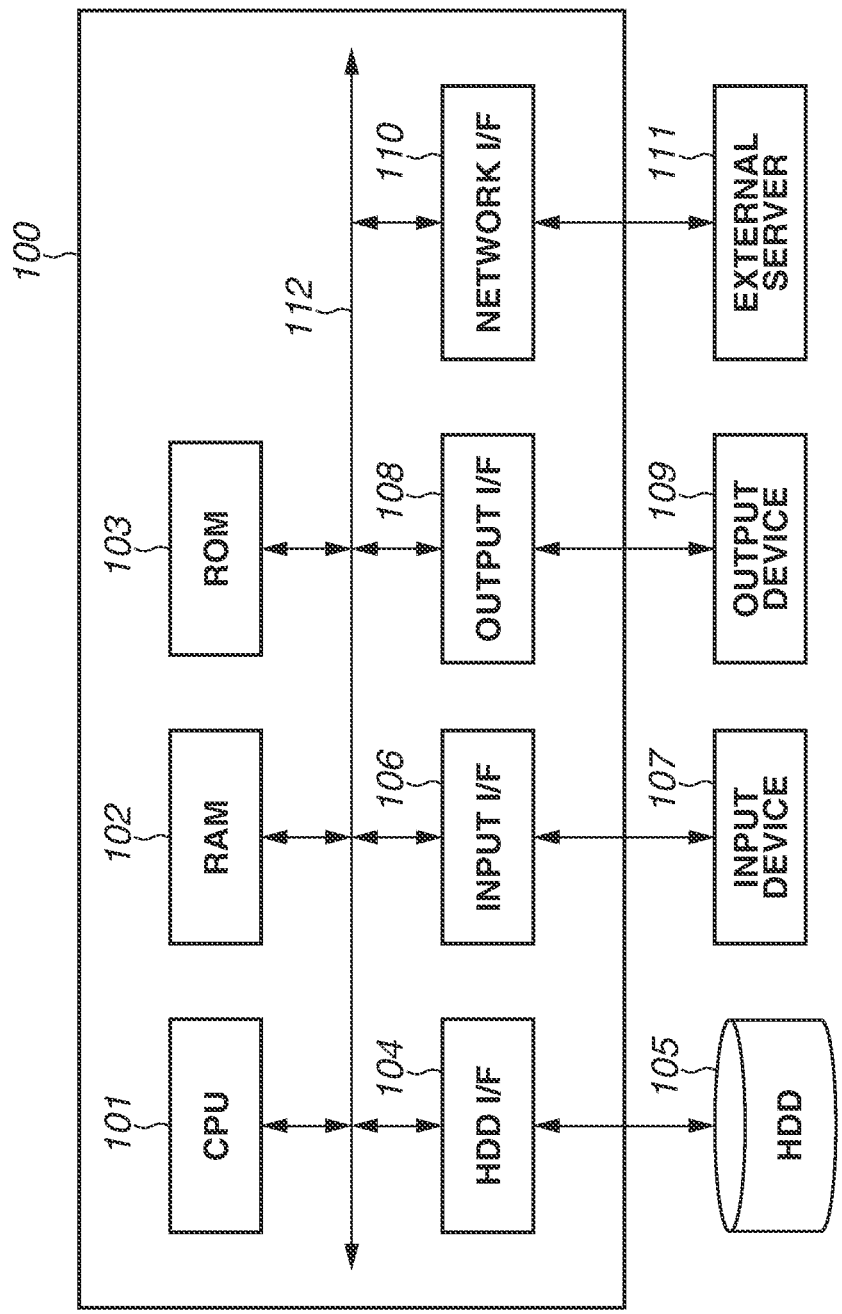
FIG. 1 is a block diagram illustrating a hardware configuration of a display control apparatus.

Various exemplary embodiments of the present disclosure will be described below with reference to the attached drawings. It should be noted that the disclosed exemplary embodiments are not intended to limit the scope of the present disclosure and, furthermore, not every combination of features described in the exemplary embodiments is always essential to a technical solution of the disclosure. Similar configurations are given the same reference numerals.

In a first exemplary embodiment, an example will be described in which a mode of displaying virtual viewpoint video images generated based on a predetermined movement path of a virtual viewpoint and a mode of displaying virtual viewpoint video images based on the position and orientation of a virtual viewpoint designated by the user, etc. are switched according to user operations. Hereinafter, the former mode will be referred to as "pre-rendering mode" and the latter mode as "real-time mode". In the present exemplary embodiment, the term "virtual viewpoint video image" refers to a video image that includes an image generated based on a plurality of captured images acquired by a plurality of cameras configured to capture an image of a field from a different direction and is generated based on the position and orientation of a virtual viewpoint (virtual camera), etc. Further, the virtual viewpoint video image in the present exemplary embodiment can be a video image of video image data generated by compressing each image frame using a predetermined moving image compression method, a video image of video image data generated by compressing each image frame using a predetermined still image compression method, or a video image of uncompressed video image data.

An example of a system configuration of a display control apparatus 100 in the present exemplary embodiment will be described below with reference to FIG. 1. In FIG. 1, a central processing unit (CPU) 101 executes a program stored in a read-only memory (ROM) 103 and/or a hard disk drive (HDD) 105 using a random-access memory (RAM) 102 as a work memory and controls each component of the display control apparatus 100 via a system bus 112. In this way, various processes which will be described below are executed. A HDD interface (I/F) 104 is an interface, such as a serial advanced technology attachment (SATA), configured to connect the display control apparatus 100 to a secondary storage device, such as the HDD 105 and an optical disk drive. The CPU 101 can read and write data from and to the HDD 105 via the HDD I/F 104. Further, the CPU 101 develops data stored in the HDD 105 onto the RAM 102. Further, the CPU 101 can save on the HDD 105 various types of data on the RAM 102 that is acquired through execution of the programs. An input I/F 106 is a serial bus interface, such as a universal serial bus (USB) interface or an Institute of Electrical and Electronics Engineers (IEEE) 1394 serial bus interface, configured to connect the display control apparatus 100 to an input device 107, such as a keyboard, a mouse, a digital camera, and a scanner. The CPU 101 can read data from the input device 107 via the input I/F 106. An output I/F 108 is a video image output interface, such as a digital visual interface (DVI) or a high-definition multimedia interface (HDMI) (registered trademark), configured to connect the display control apparatus 100 to an output device 109, such as a display. The CPU 101 can transmit data on a virtual viewpoint video image to the output device 109 via the output I/F 108 to display the virtual viewpoint video image. A network I/F 110 is a network card, such as a local area network (LAN) card, configured to connect the display control apparatus 100 to an external server 111. The CPU 101 can read data from the external server 111 via the network I/F 110.

While the example has been described in which the HDD 105, the input device 107, and the output device 109 are devices provided separately from the display control apparatus 100, the configuration is not limited to that described in the foregoing example. For example, the display control apparatus 100 can be a smartphone, or the like, and in this case, the input device 107 (touch panel) and the output device 109 (display screen) are integrated with the display control apparatus 100. Further, a device with the HDD 105 as a built-in HDD can be used as the display control apparatus 100. Further, not every component in FIG. 1 is always an essential component. For example, the external server 111 is unnecessary in the cases of reproducing virtual viewpoint video images stored in the HDD 105. On the other hand, the HDD 105 is unnecessary in the cases of generating virtual viewpoint video images acquired from the external server 111. Further, the display control apparatus 100 may include a plurality CPUs 101. Further, the display control apparatus 100 can include one or more pieces of dedicated hardware and/or one or more graphics processing units (GPUs) which are different from the CPU 101 so that at least some of the processing performed by the CPU 101 may be performed by the hardware and/or the GPU(s). Examples of dedicated hardware include an application-specific integrated circuit (ASIC), a field-programmable gate array (FPGA), and a digital signal processor (DSP).

Figure 2:
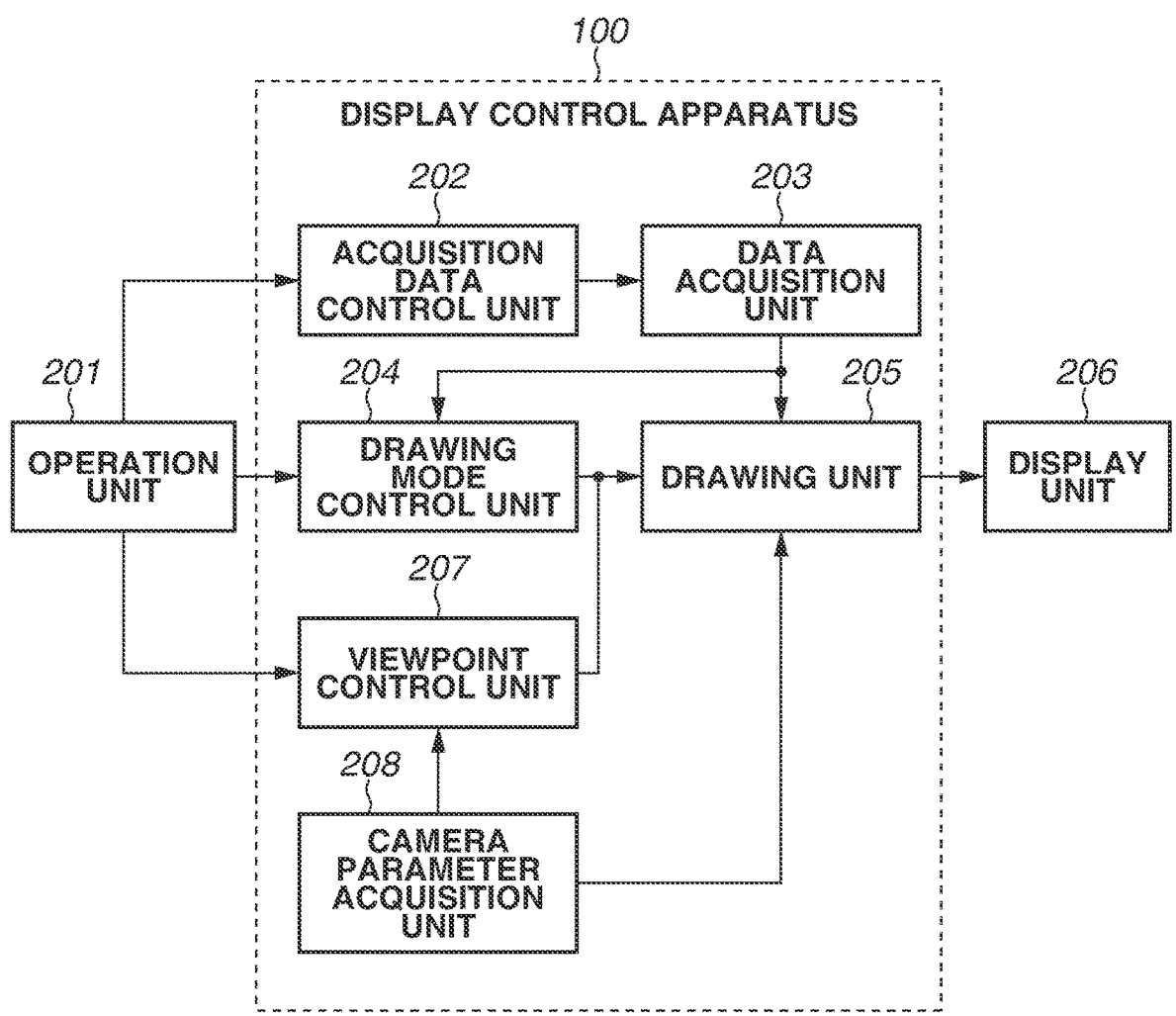
FIG. 2 is a block diagram illustrating a functional configuration of the display control apparatus.

A sequence of processing performed by the display control apparatus 100 in the present exemplary embodiment will be described below with reference to FIGS. 2 and 3. FIG. 2 is a block diagram illustrating a functional configuration of the display control apparatus 100 in the present exemplary embodiment. The CPU 101 reads a program stored in the ROM 103 and/or the HDD 105 and executes the read program using the RAM 102 as a work area to play the role of each functional block in the display control apparatus 100 in FIG. 2. An operation unit 201 and a display unit 206 in FIG. 2 respectively correspond to the input device 107 and the output device 109 in FIG. 1. Further, the CPU 101 does not have to play the role of every functional block in the display control apparatus 100, and dedicated processing circuits corresponding to the respective functional blocks may be provided.

Figure 3:
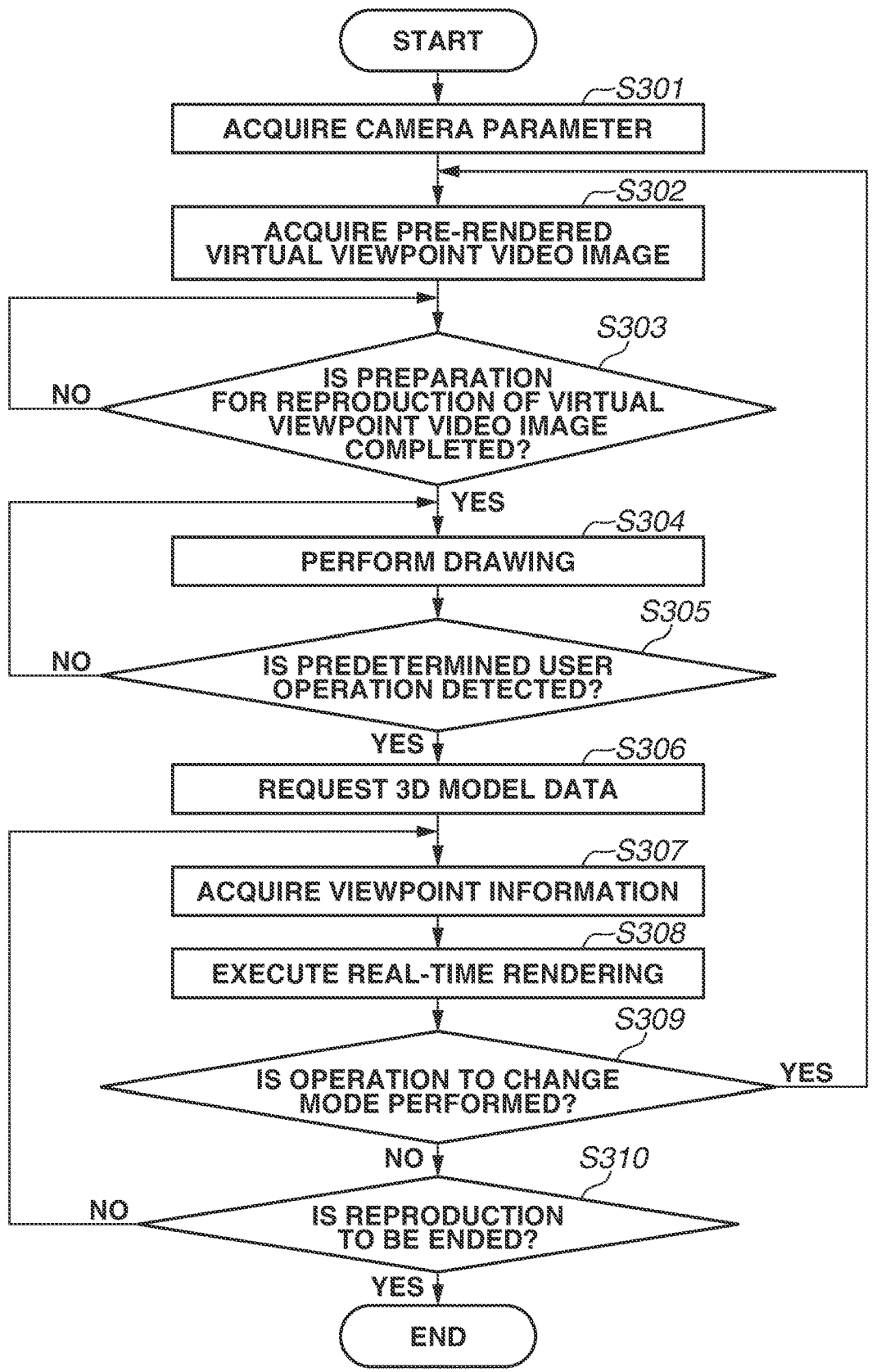
FIG. 3 is a flowchart illustrating a sequence of processing at the display control apparatus according to one or more aspects of the present disclosure.

FIG. 3 is a flowchart illustrating a sequence of processing performed at the display control apparatus 100 in the present exemplary embodiment. The CPU 101 of the display control apparatus 100 reads a program stored in the ROM 103 and/or the HDD 105 and executes the read program using the RAM 102 as a work area to realize the processing described below with reference to FIG. 3. At the start point in FIG. 3, the display control apparatus 100 operates in the pre-rendering mode. Specifically, the display control apparatus 100 operates in a first mode in which virtual viewpoint video images generated based on a predetermined movement path of a virtual viewpoint are displayed.

In step S301, a camera parameter acquisition unit 208 starts to acquire parameters (camera parameters) of the virtual camera from the HDD 105 or the external server 111. As used herein, the term "camera parameter" refers to external and internal parameters of the virtual camera. The external parameter of the virtual camera is a parameter that specifies the position and orientation of the virtual camera. Further, the internal parameter of the virtual camera is a parameter that specifies an optical characteristic of the virtual camera. The external and internal parameters will be described in more detail below. The external parameter of the virtual camera can be expressed by formula 1 below $$\begin{bmatrix} R & t \\ 0 & 1 \end{bmatrix}, \quad \text{(formula 1)}$$

where t is the vector that represents the position of the virtual camera, and R is the matrix that represents the rotation.

Further, an internal parameter K of the virtual camera can be expressed by formula 2 below $$K = \begin{bmatrix} f & 0 & c_x \\ 0 & f & c_y \\ 0 & 0 & 1 \end{bmatrix}, \quad \text{(formula 2)}$$

where $(c_x, c_y)$ is the position of a principal point of an image, and f is the focal length of the camera.

The camera parameters may be expressed by a method other than the matrixes. For example, the position of the virtual camera may be expressed by three-dimensional coordinates, and the orientation of the virtual camera may be expressed by an enumeration of yaw, roll, and pitch values. The external and internal parameters are not limited to those described above. For example, in a system in which the orientation of the virtual camera is fixed and only the position of the virtual camera is operable, it can be unnecessary to acquire the external parameter for the orientation of the virtual camera. Information indicating the zoom value of the virtual camera may be acquired as the internal parameter of the virtual camera. As described above, the external and internal parameters the acquisition of which is started in step S301 by the camera parameter acquisition unit 208 are not limited to the above-described parameters. The timing to start the acquisition of the camera parameters is not limited to the above-described timing. For example, while the pre-rendering mode is executed, the camera parameter acquisition unit 208 does not always require the camera parameters. Thus, the acquisition of camera parameters may be started at the timing corresponding to the start of the real-time mode.

In step S302, a data acquisition unit 203 acquires moving image data (virtual viewpoint video image) from the HDD 105 or the external server 111. In step S302, the virtual viewpoint video images that are generated based on the predetermined movement path of a virtual viewpoint and stored in the HDD 105 or the external server 111 are acquired. The data acquisition unit 203 continues to acquire the virtual viewpoint video images until a stop of the acquisition is requested. A sequence of virtual viewpoint video image acquisition will be described below.

In step S303, a drawing mode control unit 204 determines whether the preparation for reproduction of virtual viewpoint video images is completed. For example, in the case where the pre-rendering mode is set, if acquisition of a predetermined number of image frames among the virtual viewpoint video images generated in advance is completed, a drawing mode control unit 204 determines that the preparation for reproduction of virtual viewpoint video images is completed. For example, in the case where the real-time mode is set, if acquisition of data (e.g., polygon data, texture data, etc. on a predetermined object on the field, hereinafter, "three-dimensional (3D) data") required to generate virtual viewpoint video images of a predetermined time is completed, the drawing mode control unit 204 determines that the preparation for reproduction of virtual viewpoint video images is completed. If the drawing mode control unit 204 determines that the preparation for reproduction of virtual viewpoint video images is not completed (NO in step S303), the drawing mode control unit 204 waits until the preparation is completed. On the other hand, if the drawing mode control unit 204 determines that the preparation for reproduction of virtual viewpoint video images is completed (YES in step S303), the processing proceeds to step S304.

In step S304, a drawing unit 205 displays the virtual viewpoint video images on a display screen of the display unit 206. In the pre-rendering mode, pre-rendered virtual viewpoint video images are acquired from the HDD 105 or the external server 111 by the data acquisition unit 203.

In step S305, the drawing mode control unit 204 acquires operation data corresponding to the user operation on the operation unit 201. Then, if the drawing mode control unit 204 determines that the operation data is operation data on a predetermined user operation (YES in step S305), the processing proceeds to step S306. On the other hand, if the drawing mode control unit 204 determines that the operation data is not operation data on the predetermined user operation or if no operation data on the user operation is acquired in step S305 (NO in step S305), the processing proceeds to step S304.

Specifically, if operation data on the predetermined user operation is received in step S305 when the pre-rendering mode (first mode) is set, the processing proceeds to step S306 to change to the real-time mode (second mode). On the other hand, if no operation data on the predetermined user operation is received in step S305 when the pre-rendering mode is set, the processing proceeds to step S304 to continue displaying the virtual viewpoint video images based on the pre-rendering mode. Specifically, the drawing mode control unit 204 executes processing to switch from the pre-rendering mode to the real-time mode in response to the predetermined user operation. In the present exemplary embodiment, the pre-rendering mode is the drawing mode in which the virtual viewpoint video images generated in advance based on the predetermined movement path of a virtual viewpoint are displayed. Further, the real-time mode is the drawing mode in which the virtual viewpoint video images based on the user operation of the virtual viewpoint that is received by a viewpoint control unit 207 are displayed.

The predetermined user operation is, for example, a user operation to change the position and orientation of the virtual viewpoint. If the user operates the operation unit 201, the user operation is received, and operation data corresponding to the user operation is input to the drawing mode control unit 204. In this way, if the user performs an operation to change the position and/or orientation of the virtual viewpoint while the virtual viewpoint video images are displayed in the pre-rendering mode, the pre-rendering mode is automatically switched to the real-time mode in response to the user operation. This configuration enables a switch of the mode by a more intuitive user operation.

The predetermined user operation is not limited to the above-described example. The predetermined user operation can also be, for example, an operation to change the regard position of the virtual camera, the focal length of the virtual camera, the angle of view of the virtual camera, and/or the like. Further, a change instruction operation to give an explicit user instruction to switch the mode can be determined as the predetermined user operation. For example, a mode selection button may be provided on a virtual viewpoint image to switch the mode in response to a user instruction operation on the button. Further, the pre-rendering mode may be switched to the real-time mode if the amount of change in the position or orientation of the virtual camera is greater than or equal to a threshold value. In step S306, the data acquisition unit 203 acquires from the HDD 105 or the external server 111 3D data necessary for generating virtual viewpoint video images (e.g., polygon data, texture data, etc. necessary for generating virtual viewpoint video images). Specifically, the data acquisition unit 203 acquires 3D data (polygon data, texture data) in response to a determination to switch from the pre-rendering mode to the real-time mode in response to the predetermined user operation. The data acquisition unit 203 continues to acquire 3D data until a stop of the 3D data acquisition is requested. Details of a sequence of 3D data acquisition will be described below.

In step S307, the viewpoint control unit 207 generates camera parameters of the virtual camera based on the user operation. Specifically, the viewpoint control unit 207 receives a user operation relating to the position and orientation of the virtual viewpoint, and/or the like that is performed using the operation unit 201 and generates camera parameters based on the user operation. The viewpoint control unit 207 generates, for example, an external parameter such that the orientation of the virtual camera is rotated rightward if the user moves the mouse rightward. Further, for example, an external parameter is generated such that the orientation of the virtual camera is changed upward if the mouse is moved upward. Then, the viewpoint control unit 207 outputs camera parameters R' and K' reflecting the user operation. When step S307 is executed for the first time, the camera parameters output from the camera parameter acquisition unit 208 are used as the camera parameters of the previous frame.

In step S308, the drawing unit 205 generates virtual viewpoint video images based on the 3D data (polygon data, texture data) acquired by the data acquisition unit 203 and outputs the generated virtual viewpoint video images to the display unit 206. The display unit 206 displays the virtual viewpoint video images acquired from the drawing unit 205. As to the real-time rendering, since an existing technique can be used, detailed description thereof is omitted. The camera parameters output from the viewpoint control unit 207 are used for the setting of the virtual camera in the rendering.

In step S309, the drawing mode control unit 204 determines whether to perform switching from the real-time mode to the pre-rendering mode. If the drawing mode control unit 204 determines not to perform switching (NO in step S309), the processing proceeds to step S310. On the other hand, if the drawing mode control unit 204 determines to perform switching (YES in step S309), the drawing mode is changed to the pre-rendering mode, and the processing proceeds to step S302. The determination may be performed based on the presence/absence of an explicit user operation to change to the pre-rendering mode. An explicit user operation is requested to be able to reduce the possibility that the drawing mode is switched at a timing that is not intended by the user. The determination, however, is not limited to the determination based on an explicit user operation. For example, it can be determined to change to the pre-rendering mode if no operation with respect to the position and orientation of the virtual viewpoint is performed on the operation unit 201 for a predetermined time. This has a merit that a plurality of rendering modes can be switched by fewer user operations. Specifically, the drawing mode control unit 204 determines whether to perform switching from the real-time mode to the pre-rendering mode in response to a user operation performed after a switch to the real-time mode in response to the predetermined user operation.

In step S310, whether the reproduction of virtual viewpoint video images is to be ended is determined. If it is determined that the reproduction of virtual viewpoint video images is to be continued (NO in step S310), the processing returns to step S307. On the other hand, if it is determined that the reproduction of virtual viewpoint video images is to be ended (YES in step S310), the process illustrated in FIG. 3 ends. The determination in step S310 is generally performed based on the content of the user operation input to the operation unit 201. The foregoing describes the sequence of processing performed at the display control apparatus 100 in the present exemplary embodiment.

<Acquisition of Virtual Viewpoint Video Image in Pre-Rendering Mode>

The acquisition of virtual viewpoint video images in the pre-rendering mode is started in step S302 in FIG. 3. Then, after the start, the acquisition of virtual viewpoint video images is performed as a separate thread from the processing of drawing virtual viewpoint video images and is continued until a specific amount of buffer becomes full or until an instruction to stop the data acquisition is received. The acquired moving image data is output to the drawing unit 205.

Figure 4:
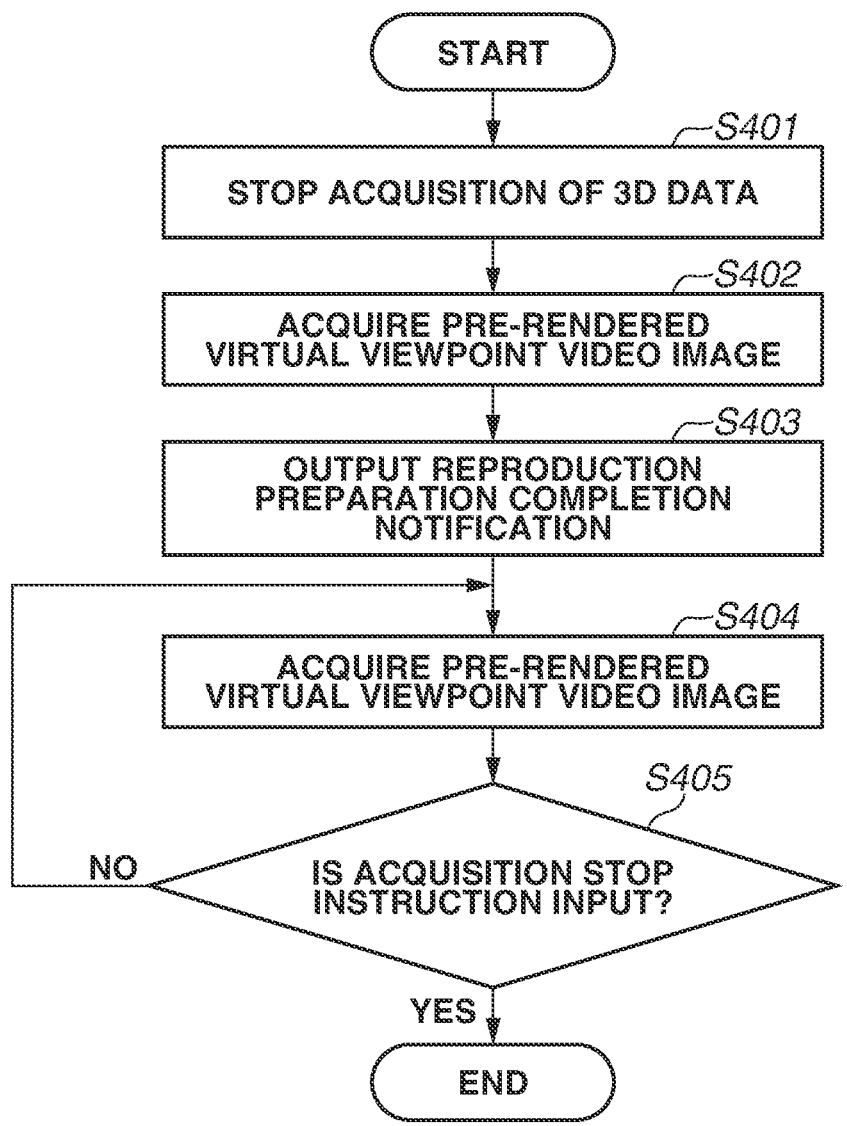
FIG. 4 is a flowchart illustrating a sequence of virtual viewpoint video image acquisition in a pre-rendering mode.

The process of acquiring virtual viewpoint video images in the pre-rendering mode will be described in detail below with reference to the flowchart in FIG. 4. The CPU 101 of the display control apparatus 100 reads a program stored in the ROM 103 and/or the HDD 105 and executes the read program using the RAM 102 as a work area to realize the processing to be described below with reference to FIG. 4.

In step S401, an acquisition data control unit 202 outputs to the data acquisition unit 203 an instruction to stop the 3D data acquisition. Step S401 is unnecessary in the cases where, for example, the reproduction of virtual viewpoint video images is started when the pre-rendering mode is set.

In step S402, the data acquisition unit 203 acquires (video image acquisition) pre-rendered virtual viewpoint video images from the HDD 105 or the external server 111 and stores the acquired pre-rendered virtual viewpoint video images in the RAM 102. The acquisition of virtual viewpoint video images in step S402 is continued until the preparation for reproduction is completed. For example, it is determined that the preparation for reproduction is completed if the data amount of virtual viewpoint video images stored in a buffer exceeds a predetermined amount.

In step S403, the data acquisition unit 203 outputs a reproduction preparation completion notification to the drawing mode control unit 204. In step S404, the data acquisition unit 203 acquires virtual viewpoint video images from the HDD 105 or the external server 111 and stores the acquired virtual viewpoint video images in the RAM 102. In the cases where the processing proceeds from step S403 to step S404, step S404 is not necessarily required.

In step S405, the data acquisition unit 203 checks whether an instruction to stop the acquisition of virtual viewpoint video images is input. If no instruction to stop the acquisition is input (NO in step S405), the processing proceeds to step S404. On the other hand, if an instruction to stop the acquisition is input (YES in step S405), the process illustrated in FIG. 4 ends. An instruction to stop the acquisition is detected if, for example, a user operation to end the reproduction of virtual viewpoint video images is input or a user operation to perform switching from the pre-rendering mode to the real-time mode is input.

<Acquisition of 3D Data in Real-Time Mode>

Acquisition of 3D data in the real-time mode is started in step S306 in FIG. 3. Then, after the start, the acquisition of 3D data is performed as a separate thread from the processing of drawing virtual viewpoint video images and is continued until a specific amount of buffer becomes full or until an instruction to stop the data acquisition is received. The acquired 3D data is output to the drawing unit 205.

Figure 5:
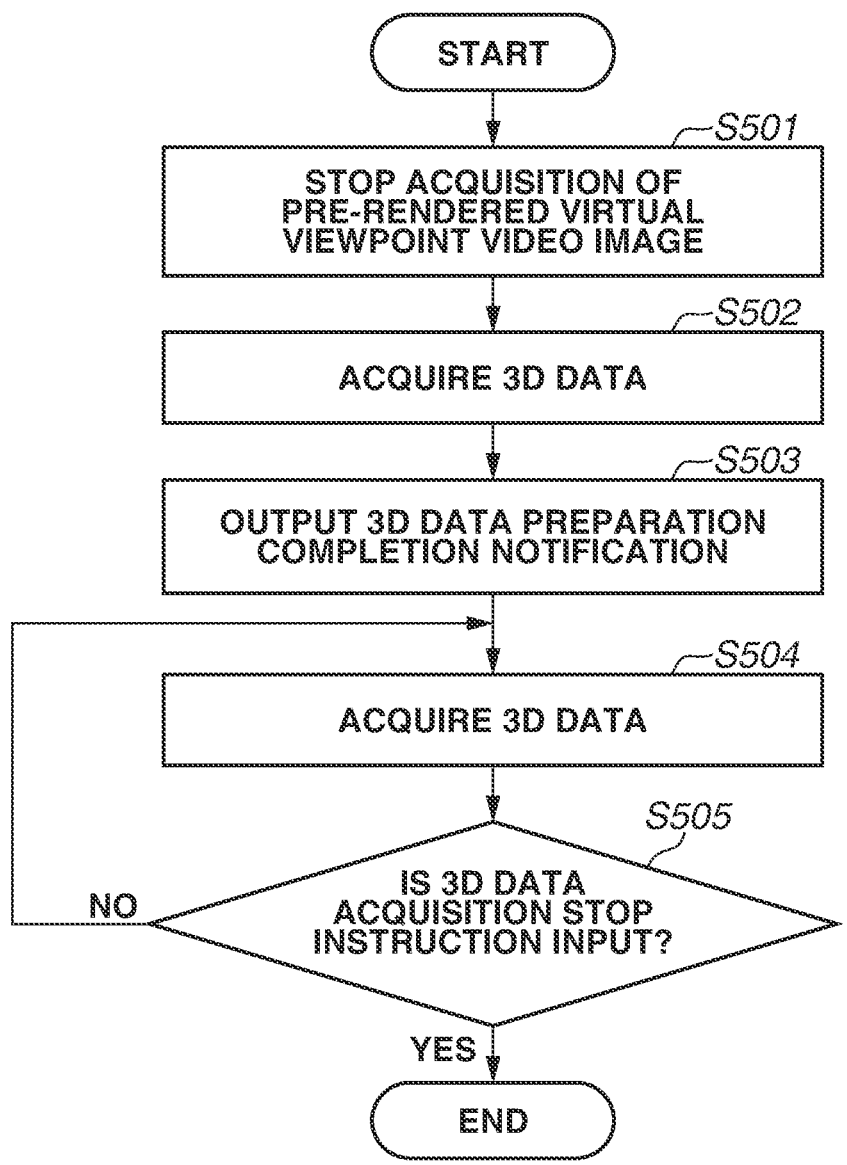
FIG. 5 is a flowchart illustrating a sequence of three-dimensional (3D) data acquisition.

The process of 3D data acquisition will be described in detail below with reference to the flowchart in FIG. 5. The CPU 101 of the display control apparatus 100 reads a program stored in the ROM 103 and/or the HDD 105 and executes the read program using the RAM 102 as a work area to realize the processing to be described below with reference to FIG. 5.

In step S501, the acquisition data control unit 202 outputs to the data acquisition unit 203 an instruction to stop the acquisition of virtual viewpoint video images. Step S501 is unnecessary in the cases where, for example, the reproduction of virtual viewpoint video images is started when the real-time mode is set.

In step S502, the data acquisition unit 203 acquires 3D data from the HDD 105 or the external server 111 and stores the acquired 3D data in the RAM 102. The acquisition of 3D data in step S502 is continued until the preparation for reproduction of virtual viewpoint video images is completed. For example, it is determined that the preparation for reproduction is completed if the amount of 3D data stored in the buffer exceeds a predetermined amount.

In step S503, the data acquisition unit 203 outputs a 3D data preparation completion notification to the drawing mode control unit 204. In step S504, the data acquisition unit 203 acquires 3D data from the HDD 105 or the external server 111 and stores the acquired 3D data in the RAM 102. In the cases where the processing proceeds from step S503 to step S504, step S504 is not necessarily required.

In step S505, the data acquisition unit 203 checks whether an instruction to stop the 3D data acquisition is input. If no instruction to stop the acquisition is input (NO in step S505), the processing proceeds to step S504. On the other hand, if an instruction to stop the acquisition is input (YES in step S505), the process illustrated in FIG. 5 ends. An instruction to stop the acquisition is detected if, for example, a user operation to end the reproduction of virtual viewpoint video images is input or a user operation to perform switching from the real-time mode to the pre-rendering mode is input.

As described in detail above, the display control apparatus 100 in the present exemplary embodiment switches the drawing mode between the pre-rendering mode and the real-time mode based on a predetermined user operation input (or based on the absence of a user operation input). Such a configuration enables a switch between the pre-rendering mode and the real-time mode by a simple method. In this way, the advantage that reproduction of virtual viewpoint video images based on the position that the user desires to view, the status of the load on the terminal, etc. is possible is produced.

A second exemplary embodiment will be described below, mainly the difference from the first exemplary embodiment. In the first exemplary embodiment, the example in which the mode is switched between the two rendering modes, the pre-rendering mode and the real-time mode, has been described. In the present exemplary embodiment, the example in which a viewpoint conversion mode and a path-based mode are further included in addition to the above-described modes will be described. The configuration of the display control apparatus 100 in the second exemplary embodiment is as illustrated in FIGS. 1 and 2, and the second exemplary embodiment will be described using the reference numerals used in FIGS. 1 and 2.

Figure 6:
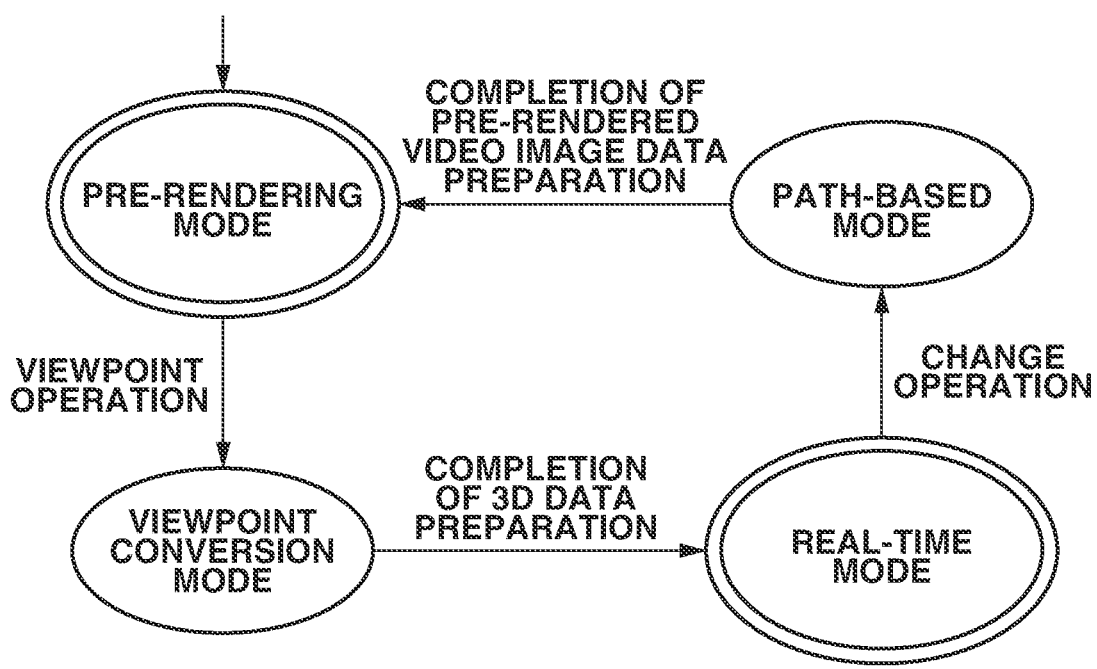
FIG. 6 illustrates transitions between drawing modes according to one or more aspects of the present disclosure.

FIG. 6 illustrates transitions between the drawing modes in the present exemplary embodiment. As illustrated in FIG. 6, the following four drawing modes are included in the present exemplary embodiment.

The pre-rendering mode in which virtual viewpoint video images generated based on a predetermined movement path of a virtual viewpoint are displayed.

The viewpoint conversion mode in which pre-rendered virtual viewpoint video images are viewpoint-converted based on a user-designated viewpoint and displayed.

The real-time mode in which virtual viewpoint video images based on the position and orientation of a virtual viewpoint designated by the user, etc. are generated based on 3D data and displayed.

The path-based mode in which virtual viewpoint video images based on a predetermined movement path of a virtual viewpoint are generated based on 3D data and displayed. Among the four modes, the modes in which the user performs a switch operation are the pre-rendering mode and the real-time mode, and the remaining two modes are modes that are temporarily used during a transition between the pre-rendering mode and the real-time mode.

If the user performs a viewpoint operation in the pre-rendering mode, the mode is temporarily changed to the viewpoint conversion mode, and after the 3D data preparation is completed, the mode is changed to the real-time mode. If the user performs an operation to switch to the pre-rendering mode during the real-time mode, the mode is temporarily changed to the path-based rendering mode, and after the preparation for reproduction of pre-rendered virtual viewpoint video images is completed, the mode is changed to the pre-rendering mode. As described above, the drawing modes for reducing operation delays between the pre-rendering mode and the real-time mode are provided, which is one of the features of the present exemplary embodiment. In the present exemplary embodiment, the term "operation delay" refers to the time from the point at which the user performs an operation to the point at which the operation is reflected on a virtual viewpoint video image. While the example of the case where the four drawing modes exist is mainly described in the present exemplary embodiment, the advantage of the present exemplary embodiment is also produced in the cases where only one of the viewpoint conversion mode and the path-based mode is included. Further, five or more drawing modes may be included.

Figure 7:
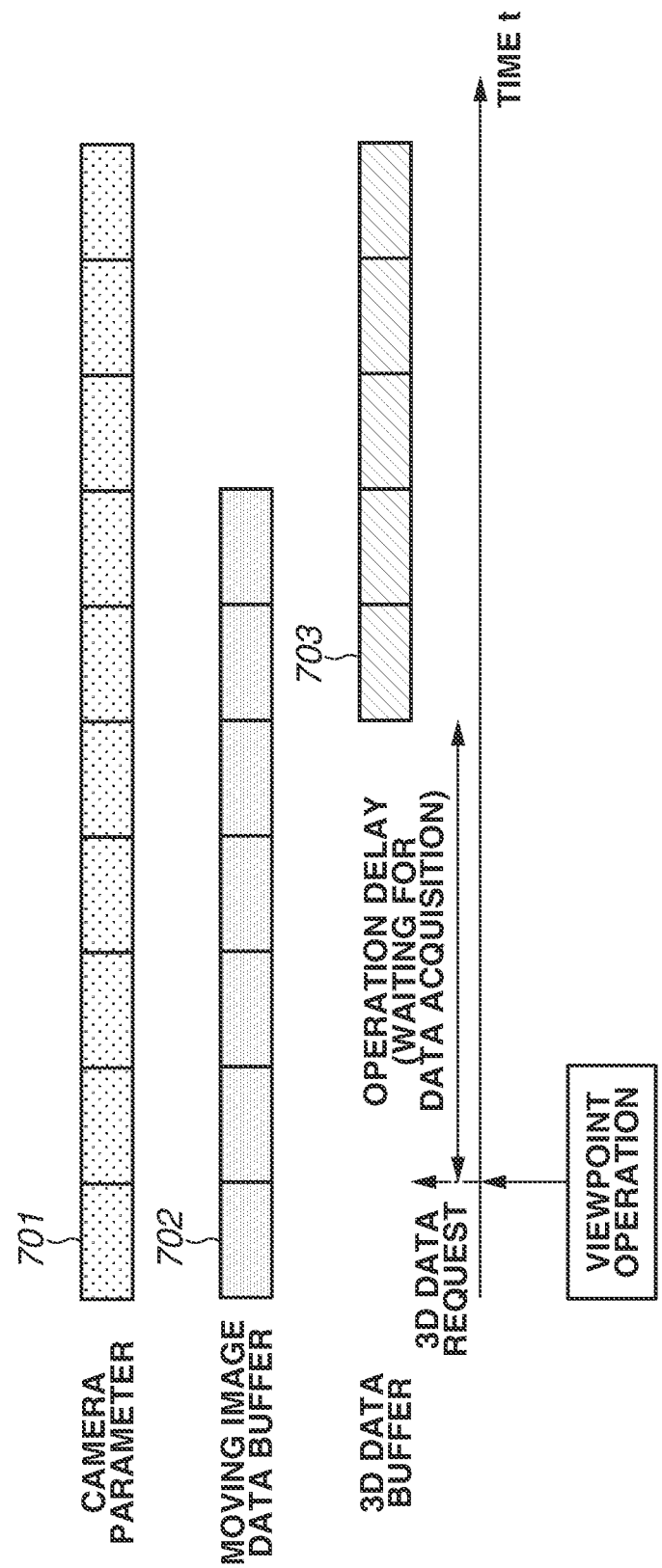
FIG. 7 illustrates an example of a switch from a pre-rendering mode to a real-time mode according to one or more aspects of the present disclosure.

A system for reducing operation delays using the four drawing modes will be described below with reference to FIGS. 7 to 10. FIG. 7 illustrates the case where the mode is switched simply from the pre-rendering mode to the real-time mode. Rectangles 701, 702, and 703 represent the buffer for camera parameters, the buffer for pre-rendered virtual viewpoint video images, and the buffer for 3D data, respectively. If a request for 3D data is made after a viewpoint operation is performed during the pre-rendering mode, since 3D data is acquired after a time elapses from the request, it takes time to display video images of a viewpoint corresponding to the user operation. This elapsed time is recognized as an operation delay by the user.

Figure 8:
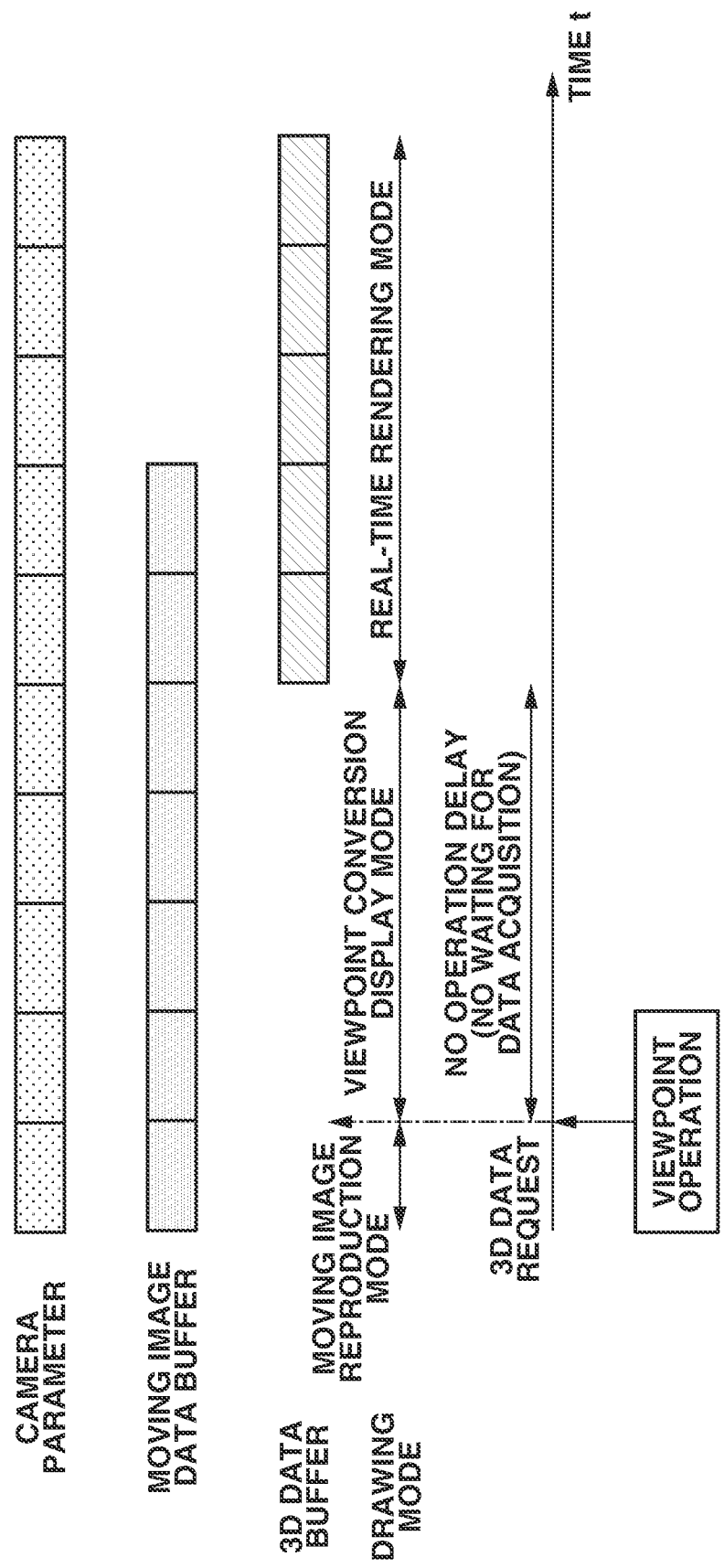
FIG. 8 illustrates an example in which a viewpoint conversion mode is added during the switch from the pre-rendering mode to the real-time mode according to one or more aspects of the present disclosure.
Figure 9:
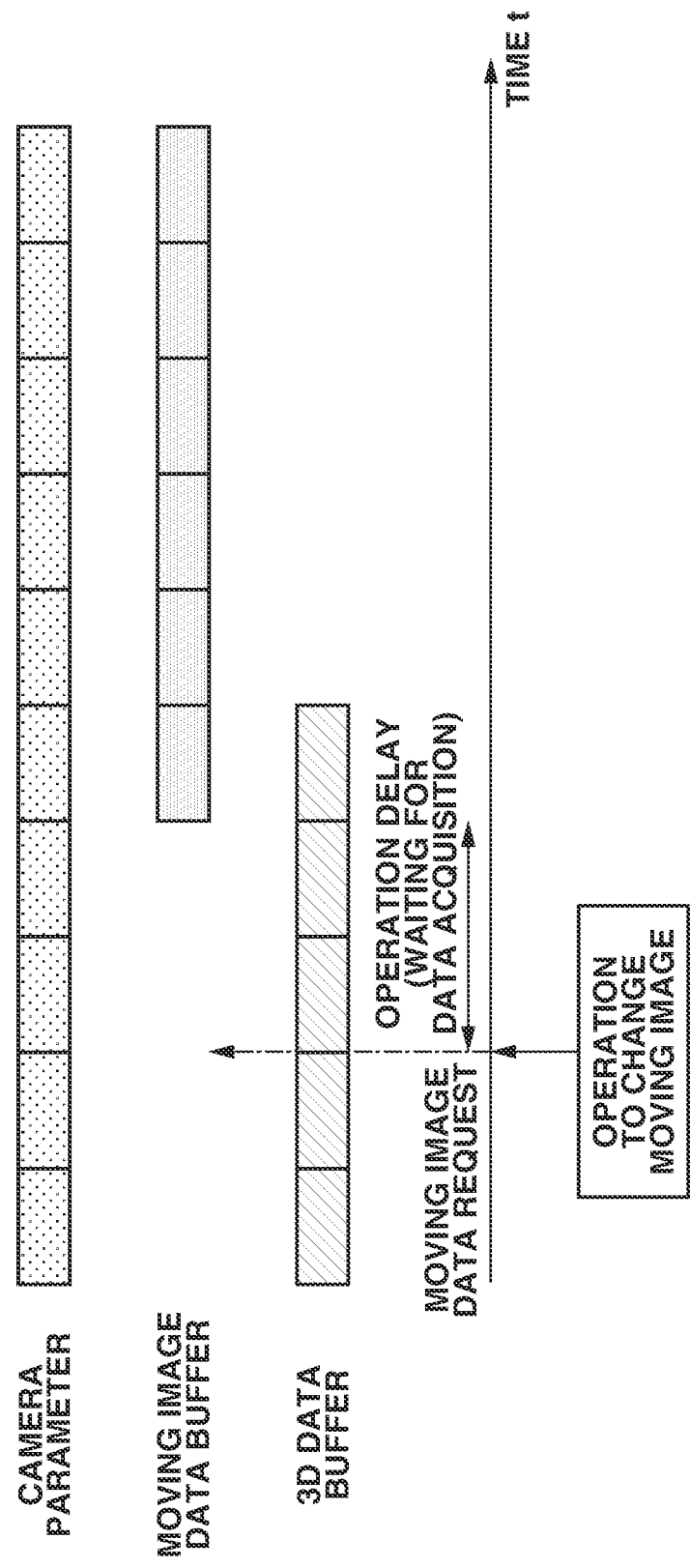
FIG. 9 illustrates an example of a switch from the real-time mode to the pre-rendering mode according to one or more aspects of the present disclosure.
Figure 10:
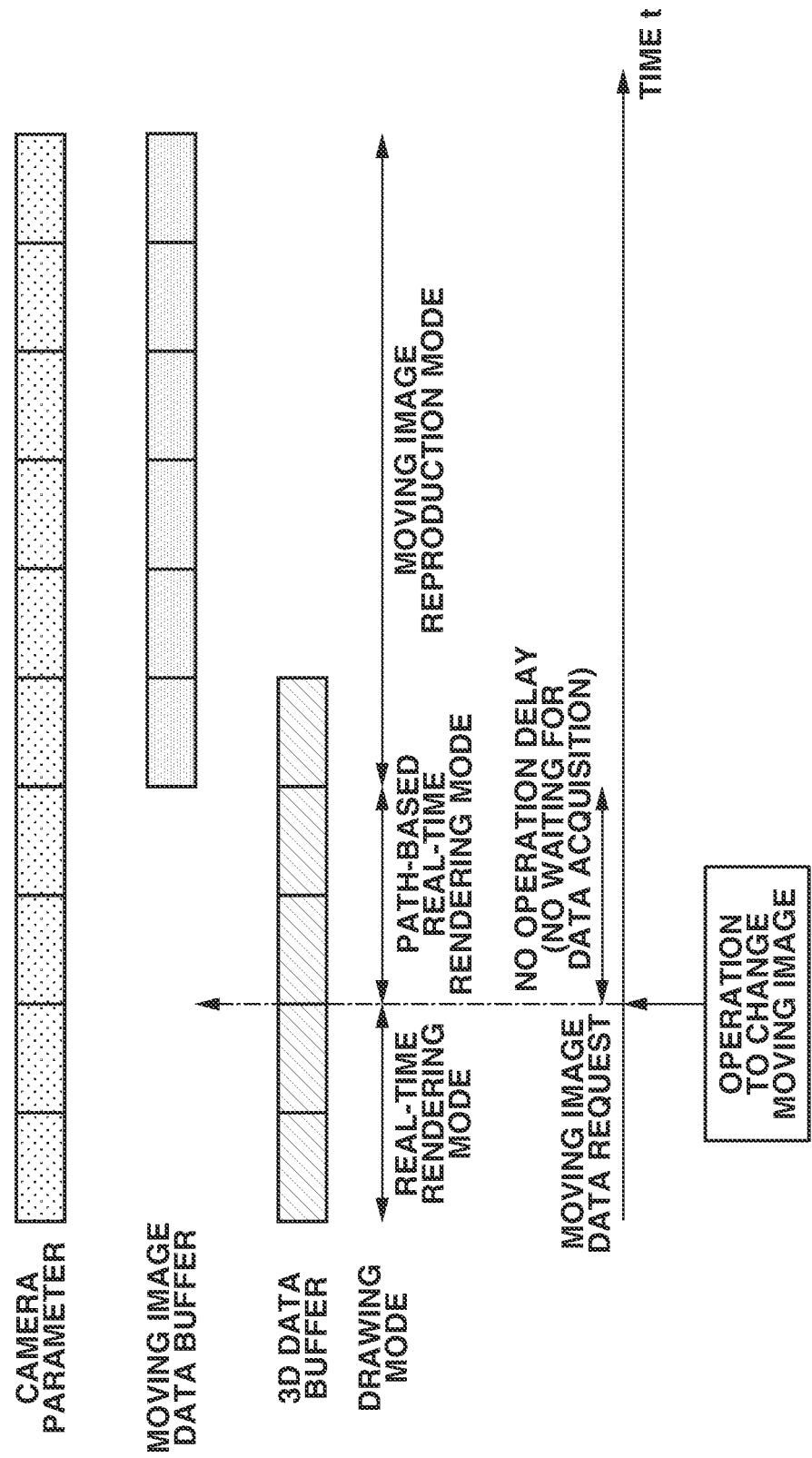
FIG. 10 illustrates an example in which a path-based rendering mode is added during the switch from the real-time mode to the pre-rendering mode according to one or more aspects of the present disclosure.

In contrast to this, FIG. 8 illustrates a case of a switch from the pre-rendering mode to the real-time mode via the viewpoint conversion mode. In this case, during a period from a viewpoint operation to the 3D data acquisition, virtual viewpoint video images that are already acquired are viewpoint-converted to generate video images reflecting the viewpoint operation, and the converted virtual viewpoint video images are displayed to reduce operation delays. FIG. 9 illustrates the case where the mode is switched simply from the real-time mode to the pre-rendering mode. In this case, during a period from a switch operation performed to the pre-rendered virtual viewpoint video images to the virtual viewpoint video image acquisition, the switch operation cannot be reflected, and operation delays occur. In contrast to this, FIG. 10 illustrates a case where the mode is changed to the path-based mode before the mode is changed from the real-time mode to the pre-rendering mode. In the path-based mode, virtual viewpoint video images based on a predetermined virtual camera path are generated using the already-acquired 3D data. In this way, the rendering based on the camera path is performed promptly after an instruction to switch to the pre-rendering mode is input, so that operation delays are reduced.

A sequence of processing performed by the display control apparatus 100 in the present exemplary embodiment will be described below with reference to FIGS. 2 and 11. FIG. 2 is a block diagram illustrating the functional configuration of the display control apparatus 100 in the present exemplary embodiment. The CPU 101 reads a program stored in the ROM 103 or the HDD 105 and executes the read program using the RAM 102 as a work area to play the role of each functional block in FIG. 2.

Figure 11:
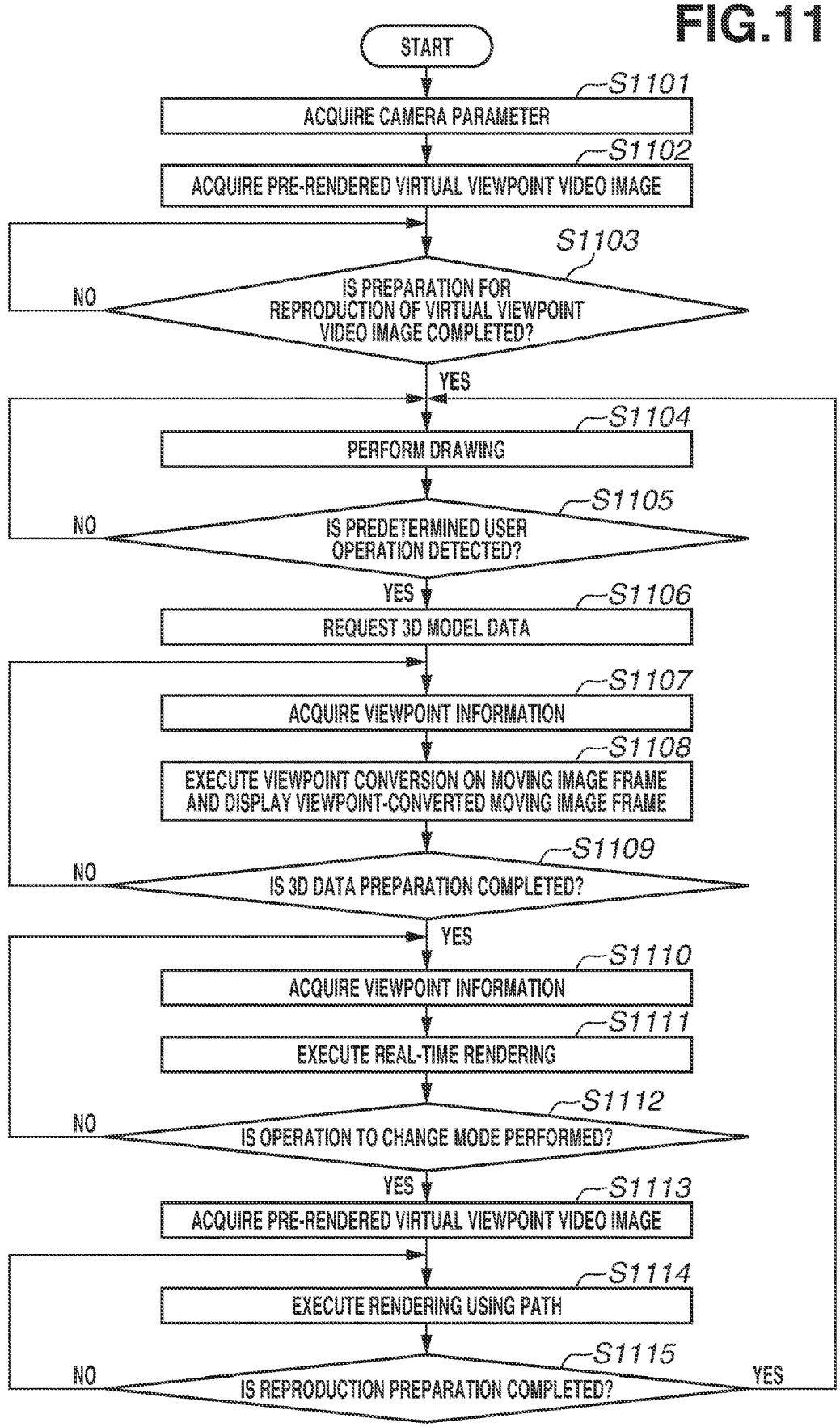
FIG. 11 is a flowchart illustrating a sequence of processing at the display control apparatus according to one or more aspects of the present disclosure.

FIG. 11 is a flowchart illustrating a sequence of processing performed at the display control apparatus 100 in the present exemplary embodiment. The CPU 101 of the display control apparatus 100 reads a program stored in the ROM 103 and/or the HDD 105 and executes the read program using the RAM 102 as a work area to realize the processing to be described below with reference to FIG. 11. Since steps S1101 to S1106 are similar to steps S301 to S306 in the first exemplary embodiment, description of steps S1101 to S1106 is omitted.

In step S1107, the viewpoint control unit 207 generates camera parameters of the virtual camera based on the user operation and outputs the generated camera parameters to the drawing unit 205. The camera parameters are used to convert the pre-rendered virtual viewpoint video images. Further, the viewpoint control unit 207 generates camera parameters of the virtual camera based on the content of the user operation performed on the operation unit 201. The camera parameters changeable in the present exemplary embodiment are the rotation matrix R expressing the orientation of the virtual camera, the focal length of the camera, and the position of the principal point of the image. Alternatively, the position of the virtual camera may also be changeable. When step S1107 is executed for the first time after the process illustrated in FIG. 11 is started, the camera parameters acquired by the camera parameter acquisition unit 208 in step S1101 are used as the camera parameters of the previous frame.

In step S1108, the drawing unit 205 performs viewpoint conversion on a virtual viewpoint image I (image included in the pre-rendered virtual viewpoint video image) to acquire a conversion virtual viewpoint image I' and outputs the conversion virtual viewpoint image I' acquired by the conversion to the display unit 206. The display unit 206 displays the conversion virtual viewpoint image I'. Specifically, the drawing unit 205 displays the converted virtual viewpoint video images generated by converting the virtual viewpoint video images based on the predetermined movement path of a virtual viewpoint based on the position and orientation of the virtual viewpoint corresponding to the user operation received by the viewpoint control unit 207. The drawing mode control unit 204 sets the viewpoint conversion mode (third mode), in which the converted virtual viewpoint video images are displayed, with respect to at least a part of a period up to the switch from the pre-rendering mode (first mode) to the real-time mode (second mode) (period setting).

The following describes a method of converting the virtual viewpoint image I into the conversion virtual viewpoint image I' which simulatively expresses an image captured with the camera parameters R', t, and K' after a viewpoint operation. Camera parameters R, t, and K are the camera parameters of the virtual viewpoint video image I acquired from the camera parameter acquisition unit 208. The pixel values of the respective pixels (x, y) in the virtual viewpoint image I which correspond to the pixels (x', y') in the conversion virtual viewpoint image I' are sampled to obtain the pixel values of the pixel (x', y') in the conversion virtual viewpoint image I'. The pixel (x, y) corresponding to the pixel (x', y') is calculable based on formulas 3 and 4 below $$q = KRR'^{-1}K'^{-1}q',  \quad \text{(formula 3)}$$

$$x = \frac{u}{w}, y = \frac{v}{w}, \quad \text{(formula 4)}$$

where q=(u, v, w) is the homogeneous vector of (x, y, 1), and q' is the homogeneous vector of (x', y', 1).

There are variations of the method of generating conversion virtual viewpoint images. For example, the sampling described above may be performed for each pixel or may be performed using an interpolation method such as a linear interpolation method or a bicubic interpolation method. In this way, the processing load can be reduced. Further, if the buffer of the data acquisition unit 203 becomes empty and a new virtual viewpoint image I cannot be acquired, a previous virtual viewpoint image I (e.g., previously-displayed virtual viewpoint image I) may be used.

In step S1109, the drawing mode control unit 204 determines whether the 3D data preparation is completed. If the 3D data preparation is not completed (NO in step S1109), the processing proceeds to step S1108. On the other hand, if the 3D data preparation is completed (YES in step S1109), the drawing mode is set to the real-time mode, and the processing proceeds to step S1110.

In step S1110, as in step S1107, the viewpoint control unit 207 generates camera parameters of the virtual camera based on the user operation and outputs the generated camera parameters to the drawing unit 205. The camera parameters of the virtual camera are generated based on the content of the user operation performed on the operation unit 201.

In step S1111, the virtual viewpoint video images that are real-time rendered based on the 3D data acquired by the data acquisition unit 203 and the camera parameters of the virtual camera generated by the viewpoint control unit 207 are output to the display unit 206. The display unit 206 displays the virtual viewpoint video images generated as described above. As to the real-time rendering, since an existing technique can be used, detailed description thereof is omitted. The camera parameters output from the viewpoint control unit 207 are used for the setting of the virtual camera in the rendering.

In step S1112, the drawing mode control unit 204 determines whether to switch the drawing mode from the real-time mode to the pre-rendering mode. If the drawing mode control unit 204 determines not to switch the drawing mode (NO in step S1112), the processing proceeds to step S1110. On the other hand, if the drawing mode control unit 204 determines to switch the drawing mode (YES in step S1112), the drawing mode control unit 204 changes the drawing mode to the path-based mode, and the processing proceeds to step S1113. The determination may be performed based on the presence/absence of an explicit user instruction operation to change the drawing mode to the pre-rendering mode or may be performed based on the status of operation on the operation unit 201 with respect to the position and orientation of the virtual viewpoint.

In step S1113, as in steps S302 and S1102, the data acquisition unit 203 acquires moving image data (virtual viewpoint video image) from the HDD 105 or the external server 111. The data acquisition unit 203 continues to acquire virtual viewpoint video images until a stop of the acquisition of virtual viewpoint video images is requested.

In step S1114, the drawing unit 205 generates virtual viewpoint video images based on the predetermined movement path of a virtual viewpoint using the 3D data acquired by the data acquisition unit 203. Then, the drawing unit 205 outputs the generated virtual viewpoint video images (path-based virtual viewpoint video images) to the display unit 206. The display unit 206 displays the virtual viewpoint video images. The camera parameters acquired from the HDD 105 or the external server 111 by the camera parameter acquisition unit 208 are used for the virtual camera setting. Specifically, the drawing mode control unit 204 sets the path-based mode (fourth mode), in which the path-based virtual viewpoint video images are displayed, with respect to at least a part of a period up to the switch from the real-time mode (second mode) to the pre-rendering mode (first mode). The path-based virtual viewpoint video images are virtual viewpoint video images based on the predetermined movement path of a virtual viewpoint and are video images generated using the 3D data (polygon data, etc.).

In step S1115, the drawing mode control unit 204 determines whether the preparation for reproduction of virtual viewpoint video images in the pre-rendering mode is completed. If, for example, acquisition of a predetermined number of image frames among the pre-rendered virtual viewpoint video images is completed, the drawing mode control unit 204 determines that the preparation for reproduction of virtual viewpoint video images is completed. If the preparation is not completed (NO in step S1115), the processing proceeds to step S1114. On the other hand, if the preparation is completed (YES in step S1115), the drawing mode is set to the pre-rendering mode, and the processing proceeds to step S1104. Although not illustrated in FIG. 11, the determination of whether to end the reproduction of virtual viewpoint video images is made as needed, and if it is determined to end the reproduction, the process illustrated in FIG. 11 ends.

As described above, the display control apparatus 100 in the present exemplary embodiment displays the virtual viewpoint video images based on the viewpoint conversion mode during at least a part of a period up to the switch from the pre-rendering mode to the real-time mode. The virtual viewpoint video images displayed in the viewpoint conversion mode are generated by converting the pre-rendered virtual viewpoint video images based on the position of the virtual viewpoint based on the user operation.

Further, the display control apparatus 100 in the present exemplary embodiment displays the virtual viewpoint video images based on the path-based mode during at least a part of a period up to the switch from the real-time mode to the pre-rendering mode. The virtual viewpoint video images displayed in the path-based mode are generated using the 3D data acquired during the real-time mode and are based on the predetermined movement path of the virtual camera. According to the present exemplary embodiment, operation delays associated with a change of the drawing mode can be reduced.

In the above-described exemplary embodiments, the examples in which the pre-rendered virtual viewpoint video images and 3D data are acquired from the HDD 105 or the external server 111 have been mainly described. The exemplary embodiments are not limited to the above-described examples. For example, virtual viewpoint video images and 3D data may be acquired from other personal computers, smartphones, tablet terminals, or the like. Further, a plurality of HDDs 105 and a plurality of external servers 111 may be provided.

The display control apparatus 100 disclosed in the exemplary embodiments can perform switching with ease between the mode of displaying the virtual viewpoint video images generated based on the predetermined movement path of a virtual viewpoint and the mode of generating virtual viewpoint video images based on a virtual viewpoint operation and displaying the generated virtual viewpoint video images.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-146339, filed Jul. 28, 2017, which is hereby incorporated by reference herein in its entirety.

What is claimed is:

1. A display control apparatus comprising:
one or more memories storing instructions; and
one or more processors executing the instructions to:
receive a user operation for designating a virtual viewpoint;
generate, based on a plurality of images captured by a plurality of imaging apparatuses that capture images of an image capturing target space from different directions, a virtual viewpoint video corresponding to the virtual viewpoint designated based on the user operation;
switch a mode from a first mode of controlling to display virtual viewpoint video that is received from a server and that corresponds to a position of a predetermined virtual viewpoint and a view direction from the predetermined virtual viewpoint to a second mode of controlling to display the generated virtual viewpoint video corresponding to a position of the virtual viewpoint designated based on the received user operation and a view direction from the virtual viewpoint designated based on the received user operation, based on detection of a specific user operation while the virtual viewpoint video that is received from the server and that corresponds to the predetermined virtual viewpoint is displayed based on the first mode; and switch a mode from the second mode to the first mode in a case where a user operation for designating a virtual viewpoint is not received for a period of a specific length in the second mode.

2. The display control apparatus according to claim 1, wherein the specific user operation is a user operation for changing at least one of the position of the predetermined virtual viewpoint and the view direction from the predetermined virtual viewpoint.

3. The display control apparatus according to claim 1, wherein the specific user operation is an instruction to change the mode from the first mode to the second mode.

4. The display control apparatus according to claim 1, wherein the specific user operation is a user operation which changes at least one of the position of the predetermined virtual viewpoint and the view direction from the predetermined virtual viewpoint by an amount greater than or equal to a threshold value.

5. The display control apparatus according to claim 1, wherein the one or more processors further execute the instructions to:
obtain three-dimensional data on a specific object in the image capturing target space based on a determination to switch the mode from the first mode to the second mode; and
generate a virtual viewpoint video based on the obtained three-dimensional data and the position of the virtual viewpoint designated based on the received user operation and the view direction from the virtual viewpoint designated based on the received user operation.

6. The display control apparatus according to claim 1, wherein the mode is switched from the second mode to the first mode based on a user operation after the switch from the first mode to the second mode based on the specific user operation.

7. The display control apparatus according to claim 1, wherein the one or more processors further execute the instructions to obtain from the server a virtual viewpoint video generated based on a preset movement path of a virtual viewpoint.

8. The display control apparatus according to claim 1, wherein the virtual viewpoint video includes a plurality of virtual viewpoint images and is processed by a moving image compression method or a still image compression method or is processed in an uncompressed state.

9. The display control apparatus according to claim 1, wherein the one or more processors further execute the instructions to control to display a converted virtual viewpoint video generated by converting, based on the position of virtual viewpoint designated based on the received user operation and the view direction from the virtual viewpoint designated based on the received user operation, the virtual viewpoint video based on the predetermined virtual viewpoint in at least a part of a period up to the switch from the first mode to the second mode.

10. A display control apparatus comprising:
one or more memories storing instructions; and
one or more processors executing the instructions to:
receive a user operation for designating a virtual viewpoint;
generate, based on a plurality of images captured by a plurality of imaging apparatuses that capture images of an image capturing target space from different directions, a virtual viewpoint video corresponding to the virtual viewpoint designated based on the user operation;
switch a mode from a first mode of controlling to display virtual viewpoint video that is received from a server and that corresponds to a position of a predetermined virtual viewpoint and a view direction from the predetermined virtual viewpoint to a second mode of controlling to display the generated virtual viewpoint video corresponding to a position of the virtual viewpoint designated based on the received user operation and a view direction from the virtual viewpoint designated based on the received user operation, based on detection of a specific user operation while the virtual viewpoint video that is received from the server and that corresponds to the predetermined virtual viewpoint is displayed based on the first mode; and
control to display a converted virtual viewpoint video generated by converting, based on the position of virtual viewpoint designated based on the received user operation and the view direction from the virtual viewpoint designated based on the received user operation, the virtual viewpoint video based on the predetermined virtual viewpoint in at least a part of a period up to the switch from the first mode to the second mode.

11. The display control apparatus according to claim 10, wherein the one or more processors further execute the instructions to:
obtain three-dimensional data on a specific object in the image capturing target space based on a determination to switch the mode from the first mode to the second mode; and
generate a virtual viewpoint video based on the obtained three-dimensional data and the position of the virtual viewpoint designated based on the received user operation and the view direction from the virtual viewpoint designated based on the received user operation.

12. A display control apparatus comprising:
one or more memories storing instructions; and
one or more processors executing the instructions to:
receive a user operation for designating a virtual viewpoint;
generate, based on a plurality of images captured by a plurality of imaging apparatuses that capture images of an image capturing target space from different directions, a virtual viewpoint video corresponding to the virtual viewpoint designated based on the user operation;
switch a mode from a first mode of controlling to display virtual viewpoint video that is received from a server and that corresponds to a position of a predetermined virtual viewpoint and a view direction from the predetermined virtual viewpoint to a second mode of controlling to display the generated virtual viewpoint video corresponding to a position of the virtual viewpoint designated based on the received user operation and a view direction from the virtual viewpoint designated based on the received user operation, based on detection of a specific user operation while the virtual viewpoint video that is received from the server and that corresponds to the predetermined virtual viewpoint is displayed based on the first mode;

obtain three-dimensional data on a specific object in the image capturing target space based on a determination to switch the mode from the first mode to the second mode; and in a case wherein the mode is switched from the second mode to the first mode based on a user operation after the switch from the first mode to the second mode based on the specific user operation, control to display a virtual viewpoint video based on the obtained three-dimensional data and a predetermined movement path of a virtual viewpoint in at least a part of a period up to the switch from the second mode to the first mode.

13. A display control method that is performed by a display control apparatus, the method comprising:

receiving a user operation for designating a virtual viewpoint;

generating, based on a plurality of images captured by a plurality of imaging apparatuses that capture images of an image capturing target space from different directions, a virtual viewpoint video corresponding to the virtual viewpoint designated based on the user operation;

switching a mode from a first mode of controlling to display virtual viewpoint video image that is received from a server and that corresponds to a position of a predetermined virtual viewpoint and a view direction from the predetermined virtual viewpoint to a second mode of controlling to display the generated virtual viewpoint video corresponding to a position of the virtual viewpoint designated based on the received user operation and a view direction from the virtual viewpoint designated based on the received user operation, based on detection of a specific user operation while the virtual viewpoint video image that is received from the server and that corresponds to the predetermined virtual viewpoint is displayed based on the first mode; and switching a mode from the second mode to the first mode in a case where a user operation for designating a virtual viewpoint is not received for a period of a specific length in the second mode.

14. The method according to claim 13, wherein the specific user operation is a user operation for changing at least one of the position of the predetermined virtual viewpoint and the view direction from the predetermined virtual viewpoint.

15. The method according to claim 13, wherein the predetermined specific operation is a user operation that changes at least one of the position of the predetermined virtual viewpoint and the view direction from the predetermined virtual viewpoint by an amount greater than or equal to a threshold value.

16. A non-transitory storage medium storing a program for causing a computer to execute a display control method, the method comprising:

receiving a user operation for designating a virtual viewpoint;

generating, based on a plurality of images captured by a plurality of imaging apparatuses that capture images of an image capturing target space from different directions, a virtual viewpoint video corresponding to the virtual viewpoint designated based on the user operation;

switching a mode from a first mode of controlling to display virtual viewpoint video image that is received from a server and that corresponds to a position of a predetermined virtual viewpoint and a view direction from the predetermined virtual viewpoint to a second mode of controlling to display the generated virtual viewpoint video corresponding to a position of the virtual viewpoint designated based on the received user operation and a view direction from the virtual viewpoint designated based on the received user operation, based on detection of a specific user operation while the virtual viewpoint video image that is received from the server and that corresponds to the predetermined virtual viewpoint is displayed based on the first mode; and switching a mode from the second mode to the first mode in a case where a user operation for designating a virtual viewpoint is not received for a period of a specific length in the second mode.

17. A display control method that is performed by a display control apparatus, the method comprising:

receiving a user operation for designating a virtual viewpoint;

generating, based on a plurality of images captured by a plurality of imaging apparatuses that capture images of an image capturing target space from different directions, a virtual viewpoint video corresponding to the virtual viewpoint designated based on the user operation;

switching a mode from a first mode of controlling to display virtual viewpoint video image that is received from a server and that corresponds to a position of a predetermined virtual viewpoint and a view direction from the predetermined virtual viewpoint to a second mode of controlling to display the generated virtual viewpoint video corresponding to a position of the virtual viewpoint designated based on the received user operation and a view direction from the virtual viewpoint designated based on the received user operation, based on detection of a specific user operation while the virtual viewpoint video image that is received from the server and that corresponds to the predetermined virtual viewpoint is displayed based on the first mode; and controlling to display a converted virtual viewpoint video generated by converting, based on the position of virtual viewpoint designated based on the received user operation and the view direction from the virtual viewpoint designated based on the received user operation, the virtual viewpoint video based on the predetermined virtual viewpoint in at least a part of a period up to the switch from the first mode to the second mode.

18. A non-transitory storage medium storing a program for causing a computer to execute a display control method, the method comprising:

receiving a user operation for designating a virtual viewpoint;

generating, based on a plurality of images captured by a plurality of imaging apparatuses that capture images of an image capturing target space from different directions, a virtual viewpoint video corresponding to the virtual viewpoint designated based on the user operation;

switching a mode from a first mode of controlling to display virtual viewpoint video image that is received from a server and that corresponds to a position of a predetermined virtual viewpoint and a view direction from the predetermined virtual viewpoint to a second mode of controlling to display the generated virtual viewpoint video corresponding to a position of the virtual viewpoint designated based on the received user operation and a view direction from the virtual viewpoint designated based on the received user operation, based on detection of a specific user operation while the virtual viewpoint video image that is received from the server and that corresponds to the predetermined virtual viewpoint is displayed based on the first mode; and controlling to display a converted virtual viewpoint video generated by converting, based on the position of virtual viewpoint designated based on the received user operation and the view direction from the virtual viewpoint designated based on the received user operation, the virtual viewpoint video based on the predetermined virtual viewpoint in at least a part of a period up to the switch from the first mode to the second mode.

19. A display control method that is performed by a display control apparatus, the method comprising:

receiving a user operation for designating a virtual viewpoint;

generating, based on a plurality of images captured by a plurality of imaging apparatuses that capture images of an image capturing target space from different directions, a virtual viewpoint video corresponding to the virtual viewpoint designated based on the user operation;

switching a mode from a first mode of controlling to display virtual viewpoint video image that is received from a server and that corresponds to a position of a predetermined virtual viewpoint and a view direction from the predetermined virtual viewpoint to a second mode of controlling to display the generated virtual viewpoint video corresponding to a position of the virtual viewpoint designated based on the received user operation and a view direction from the virtual viewpoint designated based on the received user operation, based on detection of a specific user operation while the virtual viewpoint video image that is received from the server and that corresponds to the predetermined virtual viewpoint is displayed based on the first mode;

obtaining three-dimensional data on a specific object in the image capturing target space based on a determination to switch the mode from the first mode to the second mode; and in a case wherein the mode is switched from the second mode to the first mode based on a user operation after the switch from the first mode to the second mode based on the specific user operation, controlling to display a virtual viewpoint video based on the obtained three-dimensional data and a predetermined movement path of a virtual viewpoint in at least a part of a period up to the switch from the second mode to the first mode.

20. A non-transitory storage medium storing a program for causing a computer to execute a display control method, the method comprising:

receiving a user operation for designating a virtual viewpoint;

generating, based on a plurality of images captured by a plurality of imaging apparatuses that capture images of an image capturing target space from different directions, a virtual viewpoint video corresponding to the virtual viewpoint designated based on the user operation;

switching a mode from a first mode of controlling to display virtual viewpoint video image that is received from a server and that corresponds to a position of a predetermined virtual viewpoint and a view direction from the predetermined virtual viewpoint to a second mode of controlling to display the generated virtual viewpoint video corresponding to a position of the virtual viewpoint designated based on the received user operation and a view direction from the virtual viewpoint designated based on the received user operation, based on detection of a specific user operation while the virtual viewpoint video image that is received from the server and that corresponds to the predetermined virtual viewpoint is displayed based on the first mode;

obtaining three-dimensional data on a specific object in the image capturing target space based on a determination to switch the mode from the first mode to the second mode; and in a case wherein the mode is switched from the second mode to the first mode based on a user operation after the switch from the first mode to the second mode based on the specific user operation, controlling to display a virtual viewpoint video based on the obtained three-dimensional data and a predetermined movement path of a virtual viewpoint in at least a part of a period up to the switch from the second mode to the first mode.

* * * * *